US009665575B2

(12) United States Patent
Bhogal et al.

(10) Patent No.: US 9,665,575 B2
(45) Date of Patent: May 30, 2017

(54) SYNCHRONIZATION OF MEDIA PRESENTATION SOFTWARE

(75) Inventors: Kulvir Singh Bhogal, Fort Worth, TX (US); Robert Ross Peterson, Austin, TX (US); Lisa Anne Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1853 days.

(21) Appl. No.: 11/847,719

(22) Filed: Aug. 30, 2007

(65) Prior Publication Data

US 2009/0063945 A1 Mar. 5, 2009

(51) Int. Cl.
*G06F 17/30* (2006.01)

(52) U.S. Cl.
CPC .............. *G06F 17/30056* (2013.01)

(58) Field of Classification Search
USPC ........................................ 715/203
See application file for complete search history.

(56) References Cited

U.S. PATENT DOCUMENTS

| 3,979,774 | A | 9/1976 | Chen et al. |
|---|---|---|---|
| 6,041,333 | A | 3/2000 | Bretschneider et al. |
| 6,108,687 | A | 8/2000 | Craig |
| 6,128,629 | A | 10/2000 | Bretschneider et al. |
| 6,636,238 | B1 | 10/2003 | Amir et al. |
| 6,654,785 | B1 | 11/2003 | Craig |
| 6,728,753 | B1 | 4/2004 | Parasnis et al. |
| 6,789,228 | B1 | 9/2004 | Merril et al. |
| 7,191,214 | B2 * | 3/2007 | Watanabe ............... 709/204 |
| 7,373,590 | B2 * | 5/2008 | Woolf et al. ........... 715/230 |
| 7,373,608 | B2 * | 5/2008 | Lentz .................... 715/753 |
| 2004/0013434 | A1 | 1/2004 | Hua |

(Continued)

FOREIGN PATENT DOCUMENTS

JP 2006173985 A 6/2006

OTHER PUBLICATIONS

Baber, R.L., and Pascoe, R.A., "Automated Capture of Multimedia Resources," IBM Technical Disclosure Bulletin, vol. 34, No. 11, pp. 14, Apr. 1992.

*Primary Examiner* — Kavita Padmanabhan
*Assistant Examiner* — Tionna Burke
(74) *Attorney, Agent, or Firm* — Mollborn Patents, Inc.; Fredrik Mollborn

(57) ABSTRACT

Methods and apparatus, including computer program products, implementing and using techniques for synchronizing a media presentation. A locally stored electronic copy of the media presentation is displayed on a presenter's presentation device and a locally stored copy of the media presentation is displayed on each of one or more participants' presentation devices. The presenter's presentation device and each participant's presentation device is operable to communicate with each other through a communications network. In response to the presenter performing an action on the electronic copy of the media presentation on the presenter's presentation device during the media presentation, data pertaining to the action is transmitted through the communications network to each participant's presentation device. The appearance of the media presentation on each participant's presentation device is changed in accordance with the data transmitted from the presenter.

28 Claims, 1 Drawing Sheet

(56) References Cited

U.S. PATENT DOCUMENTS

| | | |
|---|---|---|
| 2004/0205477 A1* | 10/2004 | Lin .......................... 715/500.1 |
| 2004/0252185 A1* | 12/2004 | Vernon et al. ............. 348/14.08 |
| 2005/0246642 A1 | 11/2005 | Valderas et al. |
| 2006/0041687 A1 | 2/2006 | Caspi et al. |
| 2007/0134644 A1 | 6/2007 | Jones et al. |

* cited by examiner

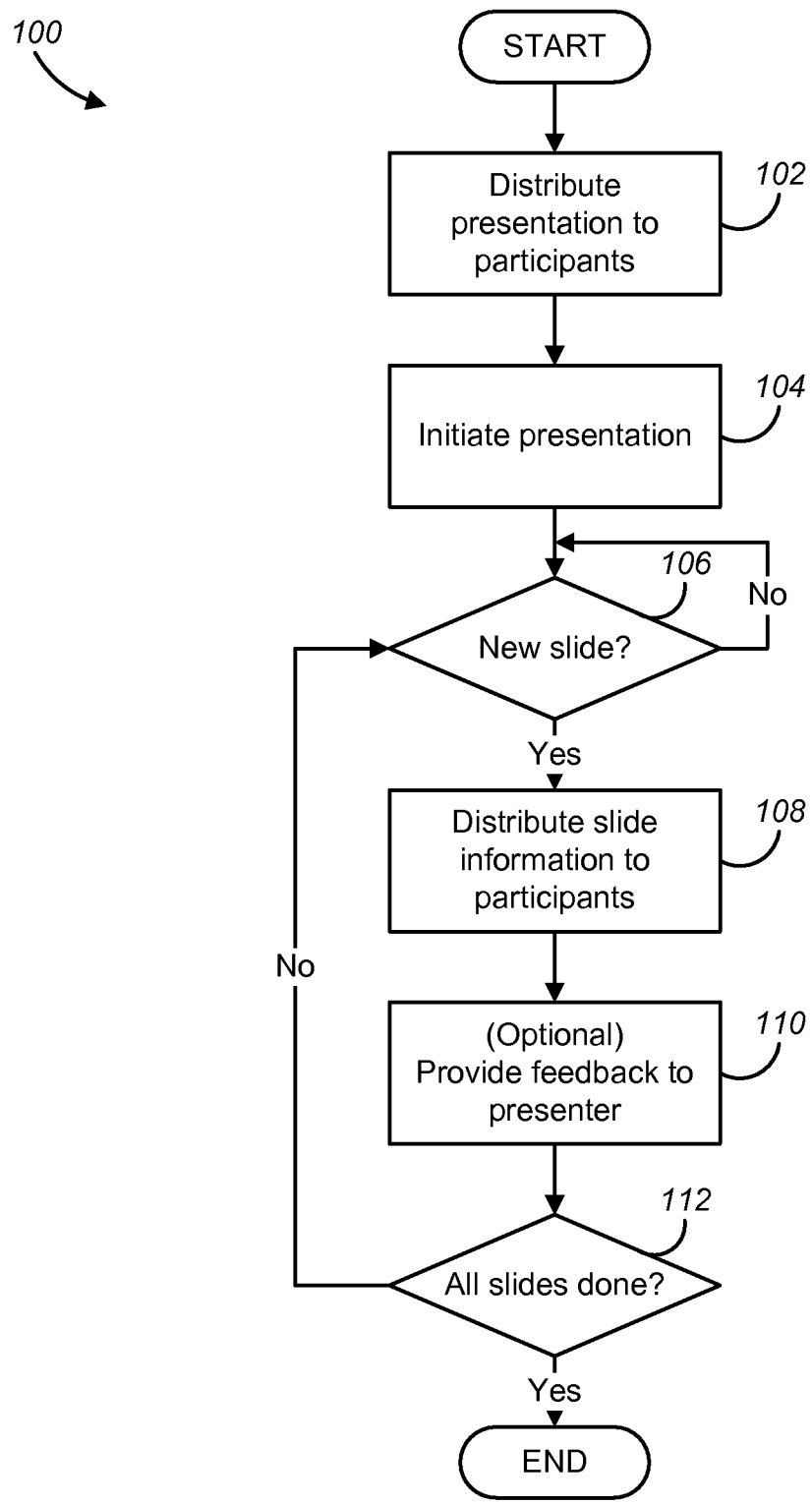

SYNCHRONIZATION OF MEDIA PRESENTATION SOFTWARE

BACKGROUND

This invention relates to techniques for presenting media to a group of users in an online environment. In today's work environment where people often work in offices located in different cities, it is common to do various types of media presentations, such as slide show presentations, using various types of computer networks, such as Intranets or the Internet. Typically, the presentations are done in conjunction with a telephone conference call, so that the participants can listen to and ask questions to the presenter.

In some cases, the slides used in the presentation are distributed to all the participants before the presentation, for example, through e-mail or by downloading the slides from a server to the participants' computers. During the presentation, each participant views her own copy of the slides on her computer using some kind of slideshow presentation software, for example, the PowerPoint® software application which can be obtained from Microsoft Inc. of Redmond, Wash. A challenge to this approach is to keep the slides synchronized amongst the participants during the presentation. Typically, the moderator must tell the participants whenever he changes slides and verbally state what slide he is on. If a participant were to miss a slide number announcement, he may get confused and not realize that the presenter is talking about a different slide.

In other cases, no slides are provided to the participants in advance of the presentation. Instead, some kind of web conferencing solution is used. One commonly used web conferencing system is provided by WebEx Communications Inc. of Santa Clara, Calif. In the web conferencing solution, the presenter and participants register with a web service, and during the presentation a bitmap representation of what is shown on the presenter's computer screen is transmitted to all the participants in real time and displayed in a web browser. That is, no special software is required to be installed on the presenter's or participants' computers. However, the participants lack the ability of going back and forth between slides as the presentation is going on, and can only view the slide that is currently selected by the presenter.

SUMMARY

In general, in one aspect, the invention provides methods and apparatus, including computer program products, implementing and using techniques for synchronizing a media presentation. A locally stored electronic copy of the media presentation is displayed on a presenter's presentation device and a locally stored copy of the media presentation is displayed on each of one or more participants' presentation devices. The presenter's presentation device and each participant's presentation device is operable to communicate with each other through a communications network. In response to the presenter performing an action on the electronic copy of the media presentation on the presenter's presentation device during the media presentation, data pertaining to the action is transmitted through the communications network to each participant's presentation device. The appearance of the media presentation on each participant's presentation device is changed in accordance with the data transmitted from the presenter.

The invention can be implemented to include one or more of the following advantages. The participants know at all times what slide the presenter is referring to. Only a small amount of information is sent through the computer network to the participants, thereby preserving valuable bandwidth. The presenter can obtain information in real time, or after the presentation, about what slides individual participants, or the group of participants as a whole, spent most or least time on. The presenter can highlight sections of individual slides to indicate to the participants what section of the slide is being discussed. The control of the presentation can be handed off, temporarily or permanently, from the moderator to one of the participants. It is easy for all participants to be redirected to a particular position in the presentation. The presenter can at any time relinquish control to one of the participants. The presenter can be informed when all users have advanced to a particular portion of their respective local copies of the presentation.

The details of one or more embodiments of the invention are set forth in the accompanying drawings and the description below. Other features and advantages of the invention will be apparent from the description and drawings, and from the claims.

DESCRIPTION OF DRAWINGS

FIG. 1 shows a flowchart of a process for performing a media presentation in accordance with one embodiment of the invention.

Like reference symbols in the various drawings indicate like elements.

DETAILED DESCRIPTION

Embodiments of the invention will be described below by way of example and with reference to a slide show presentation. It should, however, be noted that the various embodiments of invention are not limited to slide show presentations only, and that the concepts described herein can be applied to other types of media, such video or various types of electronic documents, that is to be shared among a group of users. Furthermore, the operations described herein can be performed by a stand-alone software application, or be integrated partly or entirely in a slide show presentation software application. In the following description, it is assumed that each participant's computer, as well as the presenter's computer is connected to a computer network, such as an Intranet or the Internet, through a wired or wireless connection, such that information pertaining to the presentation can be exchanged between the presenter and the participants through the network.

As shown in FIG. 1, a process (100) for performing a media presentation, in this illustrative example a slideshow presentation, in accordance with one embodiment of the invention starts by an individual copy of the slideshow presentation being distributed to each participant who plans to view the slideshow presentation (step 102). The participants can either be selected by the presenter, or sign up to view the presentation in response to a general announcement or invitation, using mechanisms that are well known to those of ordinary skill in the art. This typically occurs some time before the time of the presentation, but in some implementations it is also possible for tentative participants to view a list of ongoing presentations that are available to them on their network, and instantaneously sign up to join the presentation as a participant. In some implementations, a publish-subscribe system is used, which allows the presentation software application to connect to a presenter's calendar system on his computer to obtain a list of the participants of the presentation from a calendar entry.

Alternatively, the presenter can manually enter the IP address for the participants. The distribution of the slide show presentation to the participants can be done by any conventional means, such as, for example by e-mail or by the participants downloading the slideshow presentation from a server connected to the computer network.

Next, the presentation is initiated (step 104). This step typically involves the presenter and each participant opening their personal copy of the presentation in some kind of slideshow presentation software application, such as the PowerPoint® application or a similar application. The participants' slideshow presentation software application (or their stand alone application) allows the participant to synchronize their slides with another user, in this case the presenter, by simply selecting that user from a drop-down list or other type of menu. The software then subscribes to that user's activity. An audio connection is also established so that the participants and the presenter can hear each other. In one implementation, the audio connection is established by the presenter and the participants joining a telephone conference call. In other implementations, the audio connection is established using voice over IP (VOIP) technology, such that no separate telephone connection is needed between the presenter and the participants. Instead, the audio is transmitted over the computer network along with the slideshow information.

The process then keeps checking whether the presenter has selected a new slide (step 106). When a new slide is selected by the presenter, slide information is distributed to the participants (step 108). In a simple embodiment, when the presenter changes slides, the software broadcasts an integer indicating the new slide number to the participants. The presenter's slide number can then be shown in a particular location on a participant's computer display, or a popup window can be displayed, in which the participant is asked to advance to the next slide. In more sophisticated embodiments, the new slide number is received in the participant's slideshow presentation software, where it automatically triggers the software application to display the same slide that the presenter is viewing. Regardless of which embodiment is used, this allows the participants to always stay current with what slide the presenter is talking about during any point of the presentation, which significantly reduces the chance of confusion among the participants. Furthermore, in all of these implementations, a very small amount of information is passed through the computer network compared to the bitmap images that must be transmitted during web conferencing presentations.

In some implementations, more sophisticated actions pertaining to the slides can be distributed from the presenter to the participants as well. For example, the presenter may highlight some text on a slide, rearrange the order of the slides, or perform some other kind of operation that affects the content of one or more slides in the presentation. This information can be broadcast as metadata to the participants in addition to the slide number information, and be reflected on their computer screens. For instance, in the case of highlighting text, a unique identifier can be passed that corresponds to the text box object, as well as displacement integers that describe what portion of the text is highlighted.

Some embodiments of the invention optionally allow the participants to provide feedback to the presenter (step 110). This feedback can take several forms. For example, in its simplest form, the control of the slideshow presentation can be temporarily relinquished by the presenter and passed on to one of the participants who may have questions about a particular slide. For example, consider Alice who is presenting a slideshow presentation to the participants Bob and Charlie. If, during the presentation, Bob says to Alice "Wait a second. What about this previous slide you talked about?" Alice, with a click of a button, can view on her slideshow software what slide Bob is currently viewing. Bob doesn't actually have to tell Alice what slide number he is viewing. Alice can also agree to temporarily give Bob control of the presentation, so that he can select specific areas of the slide that he is asking questions about.

Another type of feedback that can be provided to the presenter is statistical information pertaining to which slides the participants are viewing at any given instance during the presentation. For example, in the above example, Alice may want to keep track of what all the participants are viewing. A portion of Alice's computer screen can be dedicated to a grid of slides where she can see what slide Charlie, Bob, and others are viewing. In some implementations, this information can also be recorded and processed after the presentation is concluded. For example, if Alice is presenting to a remote audience of hundreds of participants she may want to view statistics of what slides where most viewed, or what slides the participants spent the most time viewing, which may give her an indication of which slides are most interesting to her audience.

Finally, the process checks whether all slides are done (step 112), that is, whether the presentation is finished. If all slides are done, the process ends, otherwise it returns to step 106 to determine whether the presenter has advanced to a new slide.

In some embodiments, the entire presentation can be saved and replayed at a later point in time. This is particularly useful for participants that are unable to attend the live presentation or who can only attend a portion of the live presentation, as it allows them to still obtain the same information at a later point in time. In one embodiment, the presentation is saved as an audio file that contains slide changing queues. This enables a participant to play the audio file and the locally saved copy of the presentation or slideshow will change to reflect the time the presenter spent on each slide.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A number of implementations of the invention have been described. Nevertheless, it will be understood that various modifications may be made without departing from the spirit and scope of the invention. For example, the invention has been described above by way of example of the participants using computers to view the presentation. However, any type of device capable of displaying a presentation, such as a PDA (Personal Digital Assistant), mobile telephone, or other types of electronic communication devices can be used. The participants have been described above as being identified by IP addresses of their devices, but it is also possible to identify participants' devices through other methods, such as, RFID (Radio Frequency Identification) tags or Bluetooth devices that know they are near a device that is somehow associated with the presentation, for example, close to a telephone that will be used in the presentation, or inside a conference room that will be used for the presentation. Accordingly, other embodiments are within the scope of the following claims.

The invention claimed is:

1. A computer-implemented method for synchronizing a media presentation, the method comprising:
    storing electronic copies of the entire media presentation on presentation devices of two or more participants prior to beginning the media presentation, wherein each presentation device is operable to communicate with the other presentation devices through a communications network;
    displaying the electronic copies of the media presentation on the participants' presentation devices;
    using a menu on any of the presentation devices to select, by any of the participants, at least one participant among the participants to be a presenter of the media presentation;
    in response to an activity performed by the selected at least one presenter on the at least one presenter's copy of the media presentation, transmitting data corresponding to the activity from the presenter's presentation device, through the network, to the presentation devices of the participants who selected the at least one presenter; and
    changing, in accordance with the transmitted data, the appearance of the electronic copies of the media presentation on the presentation devices of the participants who selected the at least one presenter.

2. The method of claim 1, further comprising:
    establishing a connection through the communications network between the participants, wherein each participant is identified by an Internet Protocol address.

3. The method of claim 1, wherein the media presentation is a slideshow and the activity of the presenter includes selecting a new slide to be displayed, and wherein changing the appearance of the media presentation on the presentation devices of the participants who selected the at least one presenter includes displaying the new slide selected by the presenter.

4. The method of claim 1, wherein the media presentation is a slideshow and the action of the presenter includes selecting a new slide to be displayed, and wherein changing the appearance of the media presentation on the presentation devices of the participants who selected the at least one presenter includes displaying an identifier for the new slide.

5. The method of claim 1, wherein the media presentation is a slideshow and the action of the presenter includes marking a region of a slide that is displayed, and wherein changing the appearance of the media presentation on the presentation devices of the participants who selected the at least one presenter includes marking the same region of the corresponding slide.

6. The method of claim 1, wherein the media presentation is a slideshow and the action of the presenter includes rearranging the order of the slides in the slideshow presentation, and wherein changing the appearance of the media presentation on the presentation devices of the participants who selected the at least one presenter includes rearranging the order of the slides in the slideshow presentation.

7. The method of claim 1, further comprising:
    using the menu to select at least one different participant to be a presenter of the media presentation.

8. The method of claim 1, further comprising:
    providing statistical feedback to the selected at least one presenter pertaining the media presentation.

9. The method of claim 8, wherein the statistical feedback includes aggregated feedback at the conclusion of the media presentation as to what part of the media presentation the participants spent most time on.

10. The method of claim 8, wherein the statistical feedback includes individual feedback at the conclusion of the media presentation as to what part of the media presentation each participant spent most time on.

11. The method of claim 8, wherein the statistical feedback includes real time data indicating what portion of the media presentation each participant is currently viewing.

12. The method of claim 1, further comprising:
    recording the media presentation for the purpose of replaying the media presentation at a later point in time.

13. The method of claim 1, wherein the presentation device is selected from the group consisting of: computers, personal digital assistants, and cellular telephones.

14. The method of claim 1, wherein different participants select different presenters when selecting the at least one presenter of the media presentation.

15. A computer program product comprising a non-transitory computer-usable medium including a computer readable program stored thereon, wherein the computer readable program when executed on a computer causes the computer to:
    store electronic copies of the entire media presentation on presentation devices of two or more participants prior to beginning the media presentation, wherein each presentation device is operable to communicate with the other presentation devices through a communications network;
    display the electronic copies of the media presentation on the participants' presentation devices;

use a menu on any of the presentation devices to receive a selection, by any of the participants, of at least one participant among the participants to be a presenter of the media presentation;

in response to an activity performed by the selected at least one presenter on the at least one presenter's copy of the media presentation, transmit data corresponding to the activity from the presenter's presentation device, through the network, to the presentation devices of the participants who selected the at least one presenter; and change, in accordance with the transmitted data, the appearance of the electronic copies of the media presentation on the presentation devices of the participants who selected the at least one presenter.

16. The computer program product of claim 15, wherein the computer readable program when executed on a computer further causes the computer to:

establish a connection through the communications network between the participants, wherein each participant is identified by an Internet Protocol address.

17. The computer program product of claim 15, wherein the media presentation is a slideshow and the activity of the presenter includes selecting a new slide to be displayed, and wherein changing the appearance of the media presentation on the presentation devices of the participants who selected the at least one presenter includes displaying the new slide selected by the presenter.

18. The computer program product of claim 15, wherein the media presentation is a slideshow and the action of the presenter includes selecting a new slide to be displayed, and wherein changing the appearance of the media presentation on the presentation devices of the participants who selected the at least one presenter includes displaying an identifier for the new slide.

19. The computer program product of claim 15, wherein the media presentation is a slideshow and the action of the presenter includes marking a region of a slide that is displayed, and wherein changing the appearance of the media presentation on the presentation devices of the participants who selected the at least one presenter includes marking the same region of the corresponding slide.

20. The computer program product of claim 15, wherein the media presentation is a slideshow and the action of the presenter includes rearranging the order of the slides in the slideshow presentation, and wherein changing the appearance of the media presentation on the presentation devices of the participants who selected the at least one presenter includes rearranging the order of the slides in the slideshow presentation.

21. The computer program product of claim 15, wherein the computer readable program when executed on a computer further causes the computer to:

use the menu to receive a selection of at least one different participant to be a presenter of the media presentation.

22. The computer program product of claim 16, wherein the computer readable program when executed on a computer further causes the computer to:

provide statistical feedback to the selected at least one presenter pertaining the media presentation.

23. The computer program product of claim 22, wherein the statistical feedback includes aggregated feedback at the conclusion of the media presentation as to what part of the media presentation the participants spent most time on.

24. The computer program product of claim 22, wherein the statistical feedback includes individual feedback at the conclusion of the media presentation as to what part of the media presentation each participant spent most time on.

25. The computer program product of claim 22, wherein the statistical feedback includes real time data indicating what portion of the media presentation each participant is currently viewing.

26. The computer program product of claim 15, wherein the computer readable program when executed on a computer further causes the computer to:

record the media presentation for the purpose of replaying the media presentation at a later point in time.

27. The computer program product of claim 15, wherein the presentation device is selected from the group consisting of: computers, personal digital assistants, and cellular telephones.

28. The computer program product of claim 15, wherein the computer readable program when executed on a computer further causes the computer to:

receive selections from different participants of different presenters when selecting the at least one presenter of the media presentation.

* * * * *